United States Patent
Choi et al.

(10) Patent No.: US 8,121,096 B2
(45) Date of Patent: Feb. 21, 2012

(54) METHOD AND APPARATUS FOR CIRCULAR BUFFER-BASED RATE MATCHING AND BURST MULTIPLEXING FOR PACKET DATA TRANSMISSION IN A COMMUNICATION SYSTEM

(75) Inventors: Jongsoo Choi, Suwon-si (KR); Yan Xin, Suwon-si (KR); Seung-Hoon Hwang, Seoul (KR); Byoung-Jo Choi, Incheon (KR)

(73) Assignees: Samsung Electronics Co., Ltd (KR); Dongguk University Industry-Academic Cooperation Foundation (KR)

( * ) Notice: Subject to any disclaimer, the term of this patent is extended or adjusted under 35 U.S.C. 154(b) by 487 days.

(21) Appl. No.: 12/195,058

(22) Filed: Aug. 20, 2008

(65) Prior Publication Data

US 2009/0052473 A1 Feb. 26, 2009

(30) Foreign Application Priority Data

Aug. 20, 2007 (KR) ........................ 10-2007-0083702

(51) Int. Cl.
*H04B 7/216* (2006.01)
*H04J 3/00* (2006.01)
*H04L 12/28* (2006.01)

(52) U.S. Cl. .......................... 370/335; 370/337; 370/412
(58) Field of Classification Search .................. None
See application file for complete search history.

(56) References Cited

U.S. PATENT DOCUMENTS

| 5,918,002 | A | 6/1999 | Klemets et al. |
| 6,959,015 | B1 | 10/2005 | Hwang et al. |
| 2003/0123409 | A1* | 7/2003 | Kwak et al. .................. 370/335 |
| 2007/0047499 | A1* | 3/2007 | Montojo et al. ............... 370/335 |
| 2009/0028129 | A1* | 1/2009 | Pi et al. ......................... 370/351 |
| 2009/0049360 | A1* | 2/2009 | Shen et al. .................... 714/752 |
| 2010/0195662 | A1* | 8/2010 | Kang et al. .................... 370/412 |

* cited by examiner

Primary Examiner — Kwang B Yao
Assistant Examiner — Jutai Kao
(74) Attorney, Agent, or Firm — The Farrell Law Firm, P.C.

(57) ABSTRACT

A method and apparatus for circular buffer-based rate matching and burst multiplexing for data transmission. According to the method and apparatus, rate matching patterns are efficiently determined according to data code rates in a wireless communication system using CBRM, and burst multiplexing is performed in units of bits without using an external channel interleaver when several RLC data blocks are transmitted via radio blocks. Accordingly, data bits are distributed into and carried by a plurality of bursts, thereby improving transmission performance.

12 Claims, 10 Drawing Sheets

METHOD AND APPARATUS FOR CIRCULAR BUFFER-BASED RATE MATCHING AND BURST MULTIPLEXING FOR PACKET DATA TRANSMISSION IN A COMMUNICATION SYSTEM

PRIORITY

This application claims priority to an application entitled "Method and Apparatus for Circular Buffer-Based Rate Matching and Burst Multiplexing for Packet Data Transmission in Communication System" filed in the Korean Industrial Property Office on Aug. 20, 2007, and assigned Ser. No. 2007-0083702, the contents of which are incorporated herein by reference.

BACKGROUND OF THE INVENTION

1. Field of the Invention

The present invention relates to a method and apparatus for improving performance degradation when channel-coded packet data multiplexed into several bursts is transmitted in a mobile communication system, such as a Time Division Multiple Access (TDMA) communication system or a Code Division Multiple Access (CDMA) communication system.

2. Description of the Related Art

Factors impeding high-speed and high-quality services in wireless communications generally originate from a wireless communication channel environment. For example, a wireless communication channel often experiences changes in the channel environment due to white noise and also signal power changes resulting from fading, shadowing, the Doppler effect according to terminal movements and frequent velocity changes, interference by other users and multipath signals, etc. Thus, in addition to technologies provided in existing $2^{nd}$ or $3^{rd}$ generation mobile communication systems, other evolved technologies capable of enhancing adaptability to channel environment changes are required.

In mobile communication systems, channel coding techniques are used to reduce the effect of signal distortion and noise on high-speed data transmission. In $2^{nd}$ and $3^{rd}$ generation mobile communication systems, for example, convolutional codes, turbo codes, and the like are widely used as channel encoders. Adaptive Modulation and Coding Schemes (AMCS) and Hybrid Automatic Repeat reQuest (HARQ) are mentioned in both $3^{rd}$ Generation partnership Project (3GPP) and 3GPP2, which are setting specifications for high-speed data packet transmission systems.

The most widely used 3GPP Global System for Mobile telecommunication/Enhanced Data Rates for GSM Evolution (GSM/EDGE) Radio Access Network (GERAN) system employs a Link Adaptation (LA) technique and an Incremental Redundancy (IR) technique as a link quality control technique.

The LA technique is a method in which Modulation and Coding Schemes (MCS) vary according to channel environment changes. A mobile station measures a Signal-to-Noise Ratio (SNR) and transmits information thereabout to a base station, thereby informing the base station of downlink channel environment. The base station predicts the downlink channel environment based on the information and selects an appropriate MSC based on the predicted value. Thus, in a system using the LA technique, an MCS employing higher order modulation and a high code rate is used for packet data transmission for a terminal neighboring a base station, which usually has good channel environment, and an MCS employing lower order modulation and a low code rate is used for packet data transmission for a terminal with poor channel environment.

The IR is a HARQ technique. When an error occurs in an initially transmitted data packet, packet retransmission is required to compensate for the erroneous packet, and in such a situation, the IR technique is used as a link quality control technique. Technically, the IR technique may be divided into a Full Incremental Redundancy (FIR) technique and a Partial Incremental Redundancy (PIR) technique. The FIR technique improves the performance of a decoder at a receiving end by transmitting a packet including parity bits generated in a channel encoder, instead of transmitting the same packet. That is, the decoder performs decoding by using new parity bits as well as information received at initial transmission, which decreases a code rate, and thus improves the performance of the decoder.

In the 3GPP GERAN system, the GERAN evolution standardization has recently been pursued in order to improve system performance and Quality of Service (QoS). In downlink and uplink packet transmission schemes, higher order modulation (16 QAM, 32 QAM), turbo codes, and an increased symbol rate are newly introduced for high-speed data transmission. Also, a maximum of two Radio Link Control (RLC) data blocks are transmitted per radio block in the existing EDGE system, but the evolved GERAN system enables a maximum of four RLC data blocks to be transmitted per radio block. Thus, a channel coding chain structure for efficient data transmission in an MSC corresponding to a combination of newly designed higher order modulation and turbo codes (or convolutional codes) must be determined.

Additionally, a newly proposed channel coding structure must maintain the same access scheme as that of the existing EDGE system, and ensure backward compatibility, for example, must support a link quality control function.

A Circular Buffer Rate Matching (CBRM) technique is a simple and efficient rate matching technique capable of supporting LA and IR techniques in combination with an MSC level newly added in the GERAN evolution system. Also, the CBRM technique can be used without an external channel interleaver, which reduces the implementation complexity of the system.

FIGS. 1 and 2 illustrate a structure for explaining a CBRM technique of the prior art when an encoder has a mother code rate of ⅓. More specifically, FIG. 1 illustrates an example of a CBRM technique using nonsystematic convolutional codes.

As illustrated in FIG. 1, bits $P_0$, $P_1$, and $P_2$ 101 to 103 encoded in a convolutional encoder 100 pass through independent sub-block interleavers 111 to 113, respectively. However, because it is impossible to discern information bits (or systematic bits) from parity bits, when nonsystematic convolutional codes are used, bits 121 to 123 interleaved in the sub-block interleavers 111 to 113 are stored in a Circular Buffer (CB) 130 while being arranged in such a manner as to be interlaced with each other at intervals of one bit.

FIG. 2 illustrates an example of a CBRM technique using turbo codes.

Referring to FIG. 2, information bits and parity bits 201 to 203 pass through independent sub-block interleavers 211 to 213, respectively, in a similar manner as illustrated in FIG. 1. Interleaved bits 221 to 223 are separated into information bits and parity bits, and the separated bits are stored in a CB 230 while being arranged in such a manner as to be interlaced with each other at intervals of one bit, as illustrated in FIG. 1.

An MCS used in the GERAN system requires only two or three rate matching patterns or Redundancy Versions (RVs) to support an IR technique, according to code rates r. That is, two rate matching patterns are needed for a code rate of r≦⅔, and three rate matching patterns are needed for a code rate of r>⅔. Thus, in applying a CBRM technique in the GERAN system, an RV is selected such that transmission data is sequentially selected from a conventional CB. With regard to this, however, data transmitted at retransmission may overlap already transmitted data, resulting in the performance degradation of an IR technique.

In the GERAN system, for example, in GERAN evolution, a minimum of one to four RLC data blocks is transmitted with one radio block. Each RLC data block passes through independent channel coding and puncturing processes, channel interleaving for the whole RLC data to be transmitted is performed, and information distributed on four bursts is transmitted. The GERAN system has a structure in which 8 time slots constitutes one TDMA frame, and one time slot carries one burst. Accordingly, for a terminal not supporting multi-slot capability, four bursts are distributed into and carried by four TDMA frames. Thus, when a CBRM technique is applied in the GERAN system, a CBRM apparatus includes sub-block interleavers, as illustrated in FIGS. 1 and 2, and thus independently channel coded data is generally distributed into and carried by four bursts without passing through an external channel interleaver. Therefore, when several RLC data blocks are sequentially mapped to and carried by four bursts, without passing through an external channel interleaving process, performance degradation may occur due to a burst error.

Particularly, when turbo codes are used, data is separated into information bits and parity bits, and the separated bits are respectively processed so as to maximize coding gain, as illustrated in FIG. 2. Consequently, when several RLC data blocks are sequentially mapped to and carried by four bursts without passing through an external channel interleaving process, performance degradation may occur due to a burst error, as mentioned above.

SUMMARY OF THE INVENTION

Accordingly, the present invention has been designed to solve at least the above-mentioned problems occurring in the prior art, and the present invention provides a method and apparatus for applying CBRM to a channel coding chain in order to efficiently transmit data in the GERAN system.

Further, the present invention provides a method and apparatus for determining a rate matching pattern for each MCS used in the GERAN system when CBRM is applied.

Further, the present invention provides a method and apparatus for burst multiplexing, which can reduce a burst error when several RLC blocks pass through a channel coding process, and are mapped to and carried by a plurality of bursts.

In accordance with an aspect of the present invention, a method of performing circular buffer rate matching in a communication system is provided. The method includes selecting a first bitstream for first transmission of an information bitstream from a bitstream that is channel-coded, is interleaved in units of sub-blocks, and then is stored in a circular buffer, the first bitstream consisting of Nc sequential bits starting from a first bit of the bitstream stored in the circular buffer; and selecting a second bitstream for retransmission of the information bitstream, the second bitstream including Nc bits including a first part and a second part, wherein the first part of the second bitstream includes bits from a last bit of bitstreams selected at previous transmission including the first transmission to a last bit of the bitstream stored in the circular buffer, and the second part of the second bitstream includes bits punctured from the bitstreams selected at the previous transmission.

In accordance with another aspect of the present invention, a method of performing circular buffer rate matching in a communication is provided. The method includes selecting a first bitstream for first transmission of an information bitstream from a bitstream that is channel-coded, is interleaved in units of sub-blocks, and then is stored in a circular buffer, the first bitstream consisting of Nc sequential bits starting from a first bit of the bitstream stored in the circular buffer; and selecting a second bitstream for retransmission of the information bitstream, the second bitstream consisting of Nc bits including a first part, a second part, and a third part. The first part of the second bitstream includes bits from a last bit of bitstreams selected at previous transmission including the first transmission to a last bit of the bitstream stored in the circular buffer, and the second and third parts of the second bitstream include bits selected in equal numbers from the respective bitstreams selected at the previous transmissions.

In accordance with yet another aspect of the present invention, a transmission apparatus using a circular buffer rate matching technique in a communication system is provided. The transmission apparatus includes a channel encoder for performing channel encoding of radio link data; a rate matching unit for performing rate matching of the encoded data according to prescribed rules; a multiplexer for uniformly arranging the data subjected to rate matching in a plurality of bursts; and a transmitter for mapping the multiplexed data to a transmission resource, and transmitting the mapped data. The prescribed rules include selecting a first bitstream for first transmission of an information bitstream from a bitstream that is channel-coded, is interleaved in units of sub-blocks, and then is stored in a circular buffer, the first bitstream including Nc sequential bits starting from a first bit of the bitstream stored in the circular buffer, and selecting a second bitstream for retransmission of the information bitstream, the second bitstream including Nc bits including a first part and a second part, the first part of the second bitstream including bits from a last bit of bitstreams selected at previous transmission including the first transmission to a last bit of the bitstream stored in the circular buffer, and the second part of the second bitstream including bits punctured from the bitstreams selected at the previous transmissions.

In accordance with another aspect of the present invention, a transmission apparatus using circular buffer rate matching in a communication system is provided. The transmission apparatus includes a channel encoder for performing channel encoding of radio link data; a rate matching unit for performing rate matching of the encoded data according to prescribed rules; a multiplexer for uniformly arranging the data subjected to rate matching in a plurality of bursts; and a transmitter for mapping the multiplexed data to a transmission resource, and transmitting the mapped data. The prescribed rules includes selecting a first bitstream for first transmission of an information bitstream from a bitstream that is channel-coded, is interleaved in units of sub-blocks, and then is stored in a circular buffer, the first bitstream including Nc sequential bits starting from a first bit of the bitstream stored in the circular buffer, and selecting a second bitstream for retransmission of the information bitstream, the second bitstream including Nc bits including a first part, a second part, and a third part, the first part of the second bitstream including bits from a last bit of bitstreams selected at previous transmission including the first transmission to a last bit of the bitstream stored in the circular buffer, and the second and third parts of the second bitstream including bits selected in numbers from the respective bitstreams selected at the previous transmission.

In accordance with another aspect of the present invention, a reception apparatus for receiving data, to which a circular buffer rate matching technique is applied, in a communication system is provided. The reception apparatus includes a demultiplexer for demultiplexing received data bursts into a plurality of data blocks; a reconstruction unit for reconstructing a bitstream to be stored in each of at least one circular buffer; and at least one channel decoder for restoring an information bitstream by decoding the bitstream from each circular buffer. The bitstream to be stored in the circular buffer includes a first bitstream selected from a bitstream that is channel-coded, is interleaved in units of sub-blocks, and then is stored in a circular buffer, in a case of first transmission, the first bitstream including Nc sequential bits starting from a first bit of the bitstream stored in the circular buffer, and includes a second bitstream in a case of retransmission, the second bitstream including Nc bits including a first part and a second part, the first part of the second bitstream including bits from a last bit of bitstreams selected at previous transmission including the first transmission to a last bit of the bitstream stored in the circular buffer, and the second part of the second bitstream including bits punctured from the bitstreams selected at the previous transmission.

In accordance with another aspect of the present invention, a reception apparatus for receiving data, to which a circular buffer rate matching technique is applied, in a communication system is provided. The reception apparatus includes a demultiplexer for demultiplexing received data bursts into a plurality of data blocks; a reconstruction unit for reconstructing a bitstream to be stored in each of at least one circular buffer; and at least one channel decoder for restoring an information bitstream by decoding the bitstream from each circular buffer. The bitstream to be stored in the circular buffer includes a first bitstream selected from a bitstream that is channel-coded, is interleaved in units of sub-blocks, and then is stored in a circular buffer, in a case of a first transmission, the first bitstream including Nc sequential bits starting from a first bit of the bitstream stored in the circular buffer, and includes a second bitstream in a case of retransmission, the second bitstream including Nc bits including a first part, a second part, and a third part, the first part of the second bitstream including bits from a last bit of bitstreams selected at previous transmission including the first transmission to a last bit of the bitstream stored in the circular buffer, and the second and third parts of the second bitstream including bits selected in equal numbers from the respective bitstreams selected at the previous transmission.

In accordance with another aspect of the present invention, a method of multiplexing data subjected to circular buffer rate matching into a plurality of bursts is provided. The method includes rate matching at least one data block to at least one circular buffer; sequentially selecting a predetermined number of bits from bitstreams subjected to rate matching to the circular buffer; and sequentially arranging the selected bits in the plurality of bursts.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Figure 1:
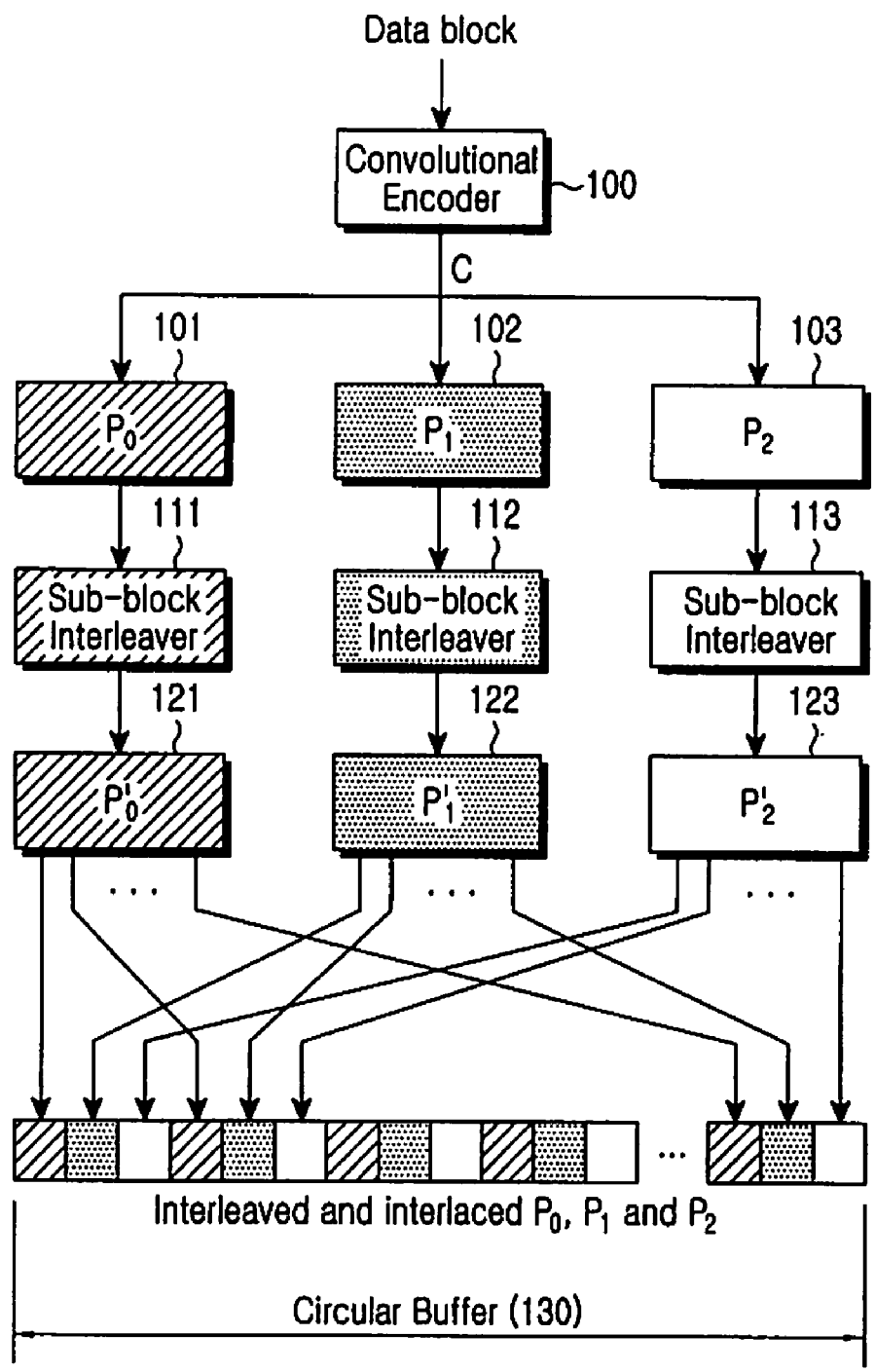
FIG. 1 is a block diagram illustrating a structure of a circular buffer rate matching unit corresponding to a conventional nonsystematic convolutional encoder.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the present invention.

Before describing the present invention in detail, a description will be given of a conventional CBRM procedure.

A typical CBRM procedure includes the following four steps:

Step 1: Bit Separation

Each sub-bitstream encoded by a channel encoder is separated into a plurality of sub-blocks according to mother code rates. For example, in FIGS. 1 and 2, each illustrating an example for a mother code rate of ⅓, an output from a channel encoder is separated into three sub-blocks. More specially, an output C from encoder 100 in FIG. 1 employing nonsystematic convolutional codes is separated into three parity bit sub-blocks $P_0$ 101, $P_1$ 102, and $P_2$ 103, and an output C from an encoder 200 in FIG. 2 employing turbo codes is separated into one information bit sub-block $P_0$ 101 and two parity bit sub-blocks $P_1$ 202 and $P_2$ 203.

Step 2: Sub-Block Interleaving

Each of the plurality of sub-blocks is independently subjected to sub-block interleaving. Various techniques may be employed for interleaving the sub-blocks. As an example, a Bit-Reversed Order (BRO) interleaver may be used.

Step 3: Bit Grouping

Figure 2:
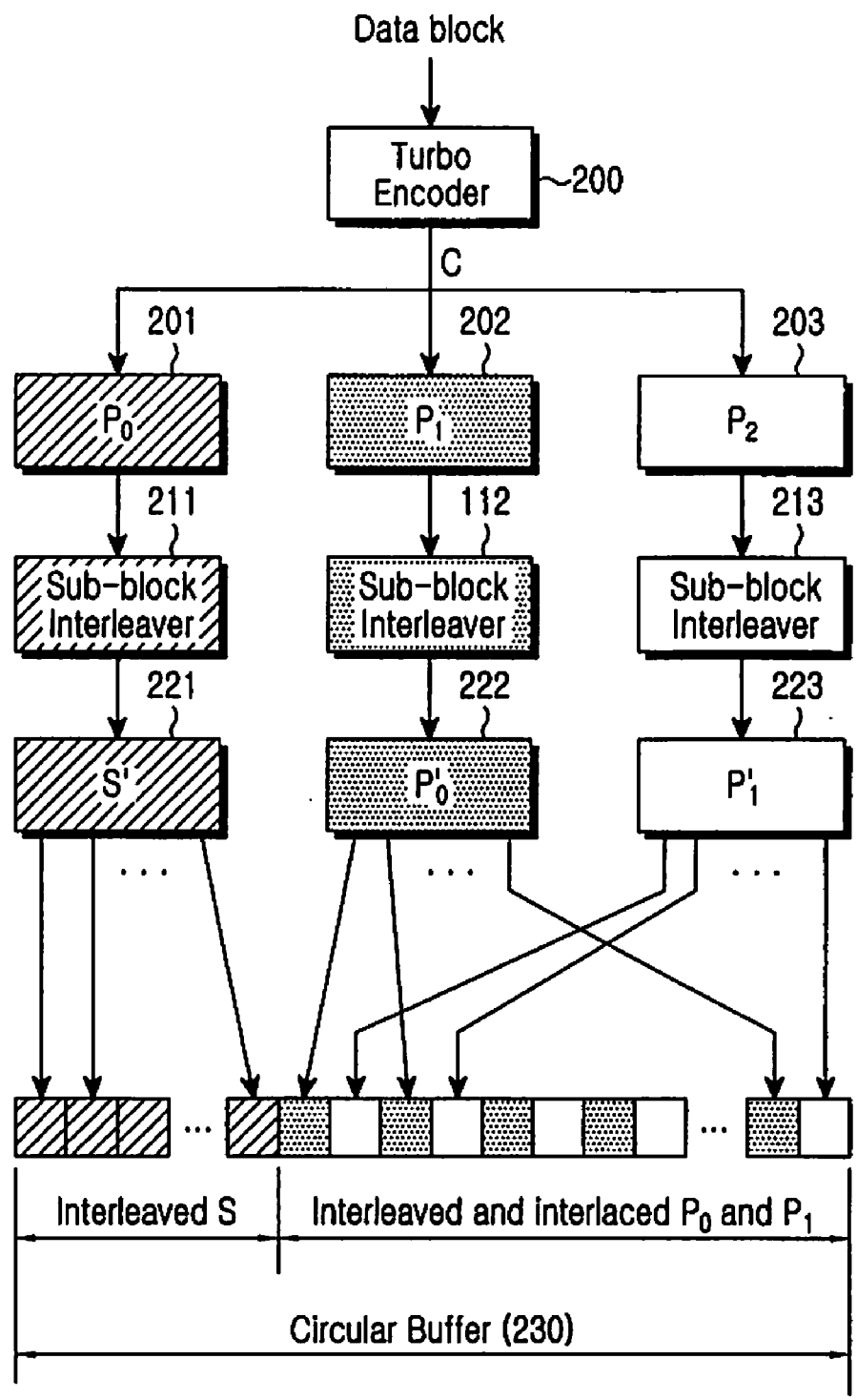
FIG. 2 is a block diagram illustrating a structure of a circular buffer rate matching unit corresponding to a conventional turbo encoder.

The interleaved sub-blocks are stored in a Circular Buffer (CB). Referring to FIG. 1, for the convolutional encoder 100, the three interleaved parity bit sub-blocks $P'_0$ 121, $P'_1$ 122, and $P'_2$ 123 are sequentially arranged in such a manner as to be interlaced in units of bits. That is, the order of storing bits in the CB 130 corresponds to CB=[$P'_0(0)$, $P'_1(0)$, $P'_2(0)$, $P'_0(1)$, $P'_1(1)$, $P'_2(1)$, ... ]=[CB(0), CB(1), ..., CB(3N−1)]. Referring to FIG. 2, for the turbo encoder 200, the interleaved information bit sub-block S' 221 and the two interleaved parity bit sub-blocks $P'_0$ 222, and $P'_1$ 223 are separately stored in the CB 230. That is, the order of storing bits in the CB 230 corresponds to CB=[S'(0), S'(1), ..., $P'_0(0)$, $P'_1(0)$, $P'_0(1)$, $P'_1(1)$, ... ].

Step 4: Transmission Bit Selection (Or RV Determination)

In step 4, data to be transmitted is selected from a CB. If the number of bits to be transmitted is Nc, Nc bits for first transmission are sequentially selected starting from the starting point of the CB. When using retransmission for an IR technique, Nc bits sequentially selected starting from a bit next to the last bit used in the first transmission are transmitted. In such order, Nc bits for next transmission are selected. In selecting bits to be transmitted one at a time, if the last index of the CB reaches, bit selection returns to the starting point of the CB, and bits to be transmitted are continuously selected.

Figure 3:
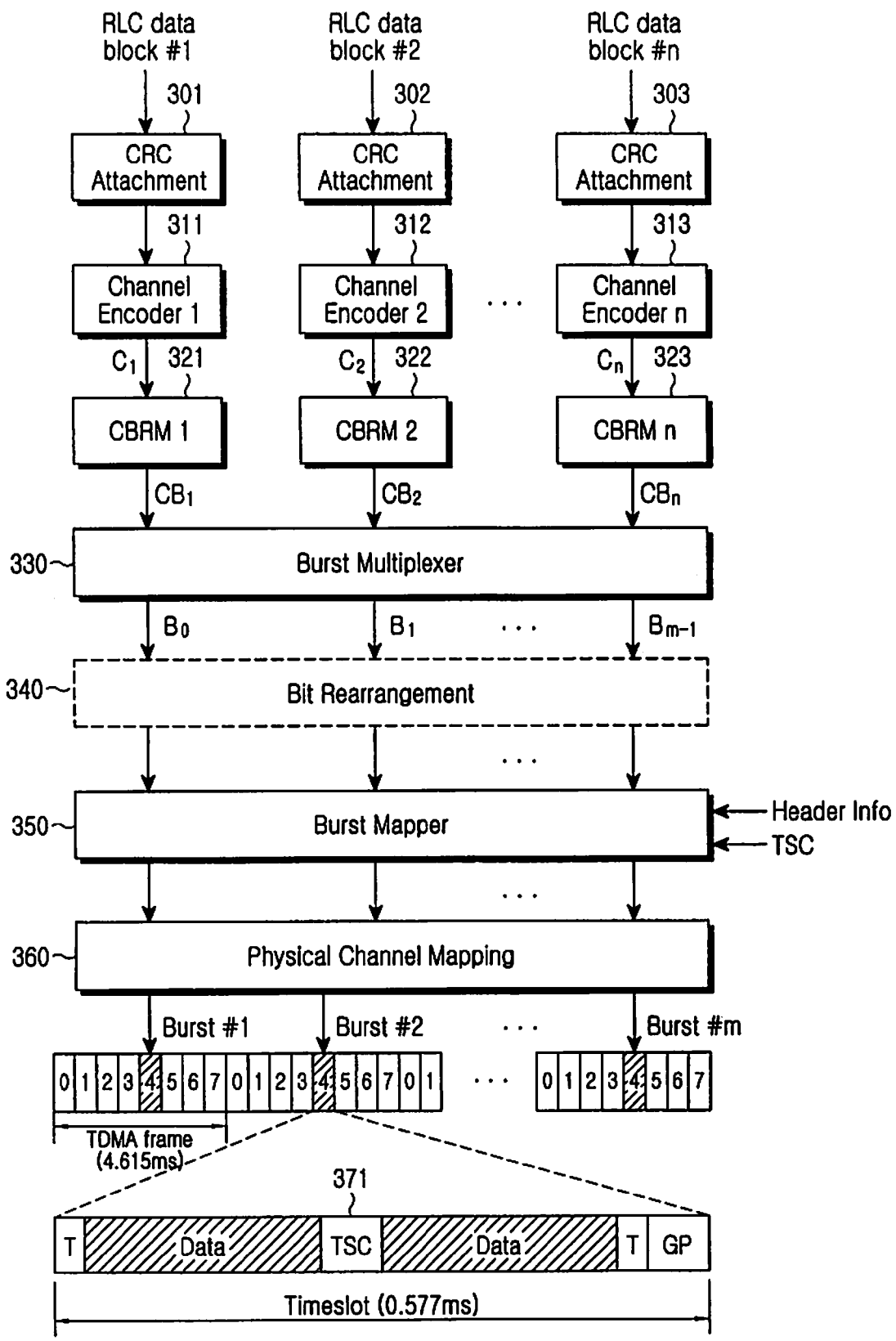
FIG. 3 is a block diagram illustrating a transmitter for transmitting RLC data blocks of GERAN system physical layers in accordance with an embodiment of the present invention.

FIG. 3 illustrates a structure of a transmitter for applying CBRM in the GERAN system according to an exemplary embodiment of the present invention. More specifically, in FIG. 3, channel encoding is performed for n RLC data blocks per radio block, and then information is distributed into and carried by m bursts via a series of processes. In the GERAN system, four bursts (i.e., m=4) are actually used per radio block. Although a rate matching unit illustrated in FIG. 3 has a structure for transmitting n RLC data blocks, it can be easily appreciated that such a structure may also be applied when one RLC block (i.e., n=1) is transmitted per radio block.

Referring to FIG. 3, n RLC data blocks are each independently attached a Cyclic redundancy Check (CRC) bit by CRC attachment units 301 to 303, and then are each independently encoded by channel encoders 311 to 313. Outputs from the channel encoders 311 to 313, corresponding to the respective RLC blocks, are designated by $C_1, C_2, \ldots, C_n$. The encoded data block $C_i$ (i=1, 2, ..., n) is forwarded to a corresponding CBRM unit 321 to 323. As described above, the CBRM units 321 to 323 perform a series of rate matching processes, and then determine an RV for selecting a transmission bitstream from a CB. A bitstream selected from the CB according to the determined RV is designated by $CB_i$ (i=1, 2, ..., n). The data block $CB_i$ (i=1, 2, ..., n) is forwarded to a burst multiplexer 330. The burst multiplexer 330 multiplexes the data block CB={$CB_1, CB_2, \ldots, CB_n$} into m bursts $B_0$ to $B_m$. When the priority of a transmission bit is considered in performing burst multiplexing, transmission bits are separated into bits with higher priority and bits with lower priority, and are subjected to bit rearrangement 340, such that symbol mapping for higher modulation (e.g., 8 PSK, 16/32/64 . . . QAM, etc.) can be performed. However, when burst multiplexing is performed without considering bit priority, bit rearrangement may be omitted.

Thereafter, the data forwarded to a burst mapper 350 is mapped to a corresponding burst (burst #1 to burst #m). In a GSM/EDGE system, a burst format is configured such that a training sequence code (TSC) 371 is located as the midamble of a burst, and transmission bits together with header information (information on header, USF, stealing flag, etc.) are mapped on both sides of the TSC. Each burst is transmitted via a modulator 360 while being mapped onto a physical channel. In a GERAN system, each burst is allocated in and carried by a time slot within a TDMS frame.

FIG. 3 illustrates a case where a user is allocated the fifth time slot (t=4) within a TDMA frame consisting of eight time slots (t=0, 1, 2, ..., 7).

In applying CBRM, the 3GPP Long Term Evolution (LTE) system defines eighth RVs in a CB. However, as described above, an MCS in the GERAN system uses convolutional codes or turbo codes with a mother code rate of ⅓, and requires only two or three RVs to support an IR technique, according to data code rates.

Before describing an RV determination method in detail, parameters to be used in the description will first be defined as follows:

Ni: number of information bits included in all RLC blocks transmitted per radio block Na: total number of bits, calculated by summation of number of bits generated after CRC attachment and channel encoding and number of tail bits of a channel encoder Nt: number of all bits output from a channel encoder, that is, Nt=3Ni+Na N: N=Nt/3

Nc: overall number of bits transmitted through four bursts r: code rate of transmission data, r=Ni/Nc When n RLC data blocks are transmitted, Ni and Nc are defined as follows:

Ni=n*Ni1, where n denotes the number of RLC data blocks to be transmitted, and Ni1 denotes no. of information bits included in one RLC data block Nc: n*Nc1, where Nc1 denotes the number of bits to be transmitted, selected from one CB Two RVs are defined for a code rate of r≦⅔ (Ni/Nc), and three RVs are defined for a code rate of r>⅔. Thus, in applying CBRM in the GERAN system, when an RV for selecting a bitstream from a conventional CB is determined, data to be transmitted is sequentially selected starting from the first index of the CB, that is, CB(0). Consequently, a bitstream selected by an RV for retransmission may include information overlapping an already transmitted bitstream according to the code rate of transmitted data, which may cause the performance degradation of an IR technique. For example, for a code rate equal to or less than 0.5, a bitstream selected by RV2 for second transmission includes bits mostly overlapping those of a bitstream selected by RV1 for first transmission. Also, for a code rate of r=⅔, a bitstream selected by RV3 for third transmission overlaps a bitstream selected by RV1, and thus there is a fear of performance degradation. Accordingly, the present invention proposes a method of determining an RV according to data code rates.

Figure 4:
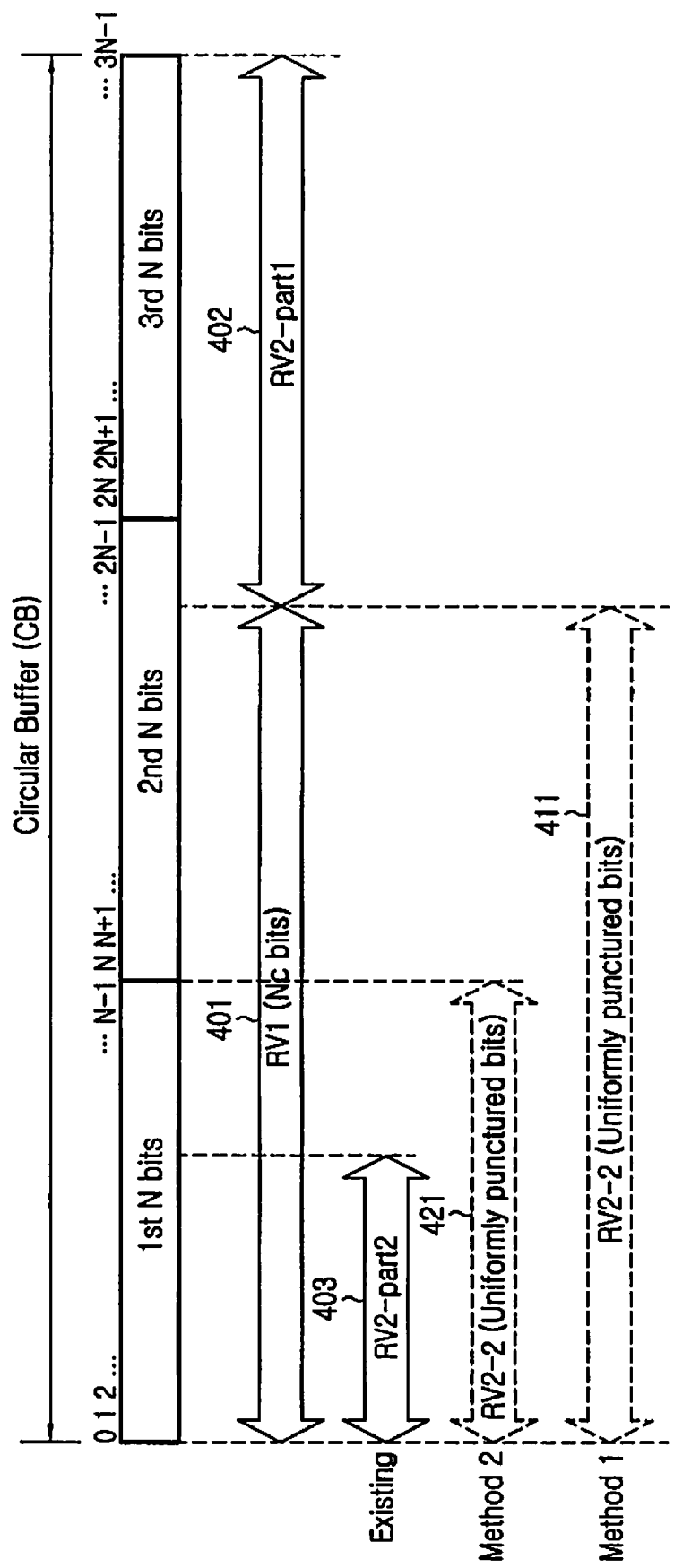
FIG. 4 is a view illustrating a method of determining RV2 for a data code rate of $r \leq 2/3$ in CBRM in accordance with an embodiment of the present invention.
Figure 5:
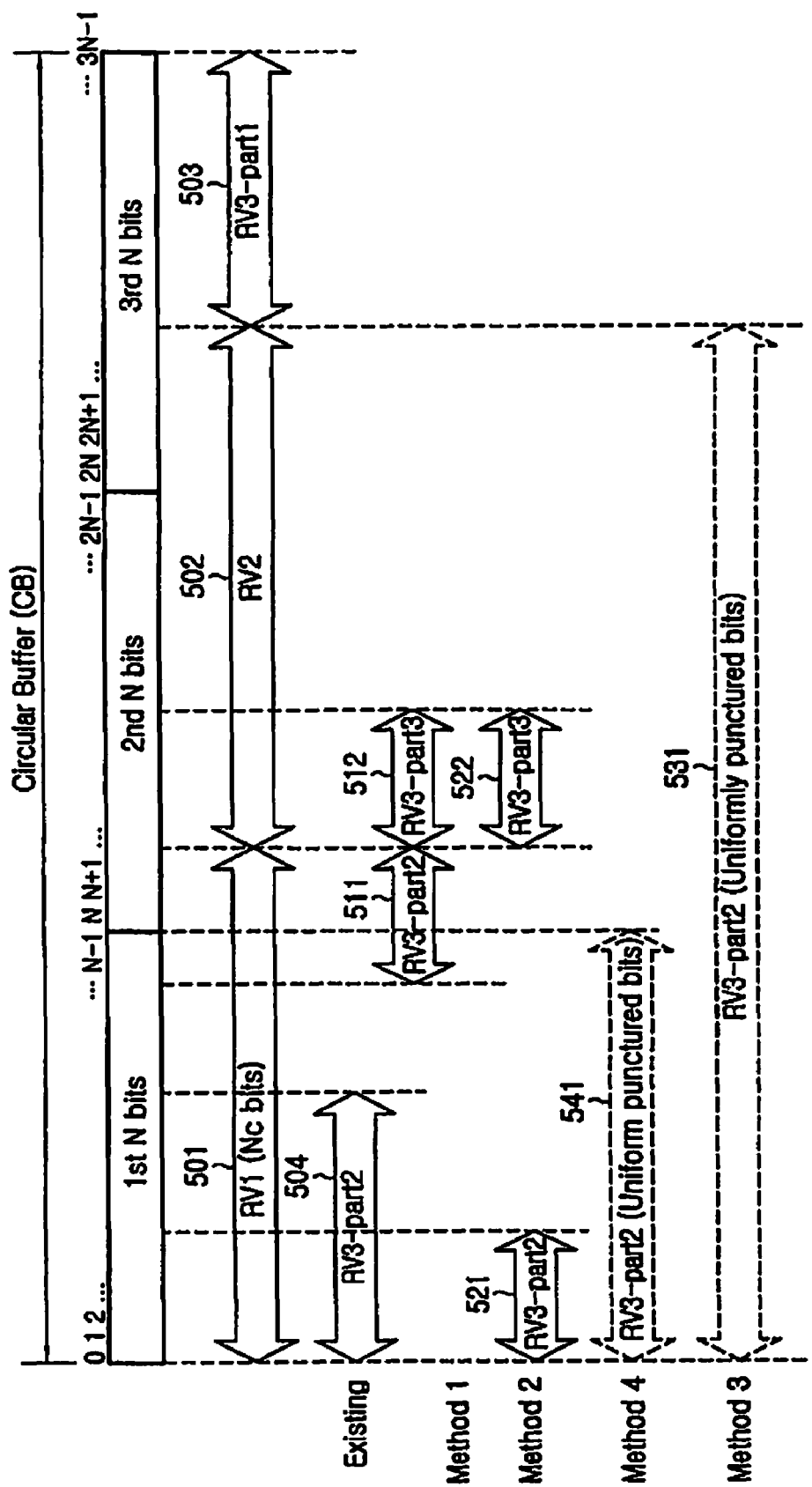
FIG. 5 is a view illustrating a method of determining RV2 for a data code rate of $r > 2/3$ in CBRM in accordance with an embodiment of the present invention.

FIGS. 4 and 5 each illustrate a method of determining an RV for two data code rates according to embodiments of the present invention.

FIG. 4 corresponds to a code rate of r≦⅔, which requires two RVs, i.e., RV1 and RV2. A bitstream of RV1 is selected in a conventional manner. The bitstream of RV1 can be expressed by the following Equation (1):

$$RV1:[CB(0), CB(1), \ldots, CB(Nc-1)] \quad (1)$$

That is, the bitstream 401 of RV1 includes Nc bits starting from the first bit CB(0) of a CB. When Nc bits of a bitstream of RV2 are selected in a conventional manner, bits from CB(Nc) to CB(3N−1) are selected first (i.e., bit pattern 402), and then as many bits as needed are selected, starting from CB(0) again (i.e., bit pattern 403). That is, the bitstream of RV2 can be expressed by the following Equation (2):

$$RV2: \begin{bmatrix} \underbrace{CB(Nc), CB(Nc+1), \ldots, CB(3N-1),}_{RV2\text{-}part1} \\ \underbrace{CB(0), CB(1), \ldots, CB(2Nc-3N-1)}_{RV2\text{-}part2} \end{bmatrix} \quad (2)$$

Accordingly, when bits to be included in the bitstream of RV2 are selected in a conventional manner, the bit pattern 403 corresponding to RV2-part2 in Equation (2) completely overlaps the beginning section of the bitstream 401 of RV1. Therefore, the present invention proposes new methods of selecting bits to be included in a bitstream of RV2-part 2.

In a first method (Method 1), uniformly distributed bits are selected from a bitstream of RV1. In a second method (Method 2), bits are selected while information bits are treated as bits with higher priority. Method 1 and Method 2 will be described in more detail herein below.

Method 1: A bitstream 411 of RV2-part2 is obtained by performing the most uniform possible puncturing for a bitstream of RV1, [CB(0), CB(1), ..., CB(Nc-1)]. According to this method, good performance can be expected in a decoding process when retransmission is performed without considering the priority of information bits and parity bits, as in the case of nonsystematic convolutional codes.

Method 2: A bitstream 421 of RV2-part2 is obtained by performing the most uniform possible puncturing for [CB(0), CB(1), ..., CB(N-1)] within a CB. Since the [CB(0), CB(1), ..., CB(N-1)] corresponds to information bits channel-coded by a turbo encoder, as many information bits as possible can be retransmitted, as compared to parity bits. Thus, good performance can be expected in a turbo decoding process.

FIG. 5 corresponds to a code rate of r>2/3, which uses three RVs, i.e., RV1, RV2, and RV3. Bits to be included in a bitstream of RV1 and bits to be included in a bitstream of RV2 are selected in a conventional manner. That is, as illustrated in FIG. 5, the bitstream 501 of RV1 and the bitstream 503 of RV2 can expressed by the following Equation (3):

$$RV1: [CB(0), CB(1), \ldots, CB(Nc-1)]$$

$$RV2: [CB(Nc), CB(Nc+1), \ldots, CB(2Nc-1)] \quad (3)$$

When Nc bits of a bitstream of RV3 are selected in a conventional manner, bits from CB(2Nc) to CB(3N-1) are selected first (i.e., bit pattern 503), and then as many bits as needed are selected starting from CB(0) again (i.e., bit pattern 504). That is, the bitstream of RV3 can be expressed by the following Equation (4):

$$RV3: \begin{bmatrix} \underbrace{CB(2Nc), CB(2Nc+1), \ldots, CB(3N-1),}_{RV3\text{-}part1} \\ \underbrace{CB(0), CB(1), \ldots, CB(3Nc-3N-1)}_{RV3\text{-}part2} \end{bmatrix} \quad (4)$$

Accordingly, when bits to be included in the bitstream of RV3 are selected in a conventional manner, the bit pattern 504 corresponding to RV3-part2 in Equation (4) completely overlaps the beginning section of the bitstream 501 of RV1. That is, the bitstream of RV3 partially overlaps the bitstream of RV1. Therefore, the present invention proposes new methods of selecting bits to be included in a bitstream of RV3-part 2.

In the first, second, and third methods (Methods A, B, and C), bits are selected from bitstreams of RV1 and RV2.

In a fourth method (Method D), bits are selected while information bits are treated as bits with higher priority. Methods A-D will be described in more detail herein below.

Method A: Bits to be included in a bitstream 511 of RV3-part2 are selected in equal numbers (50%:50%) from the end section of a bitstream 501 of RV1 and the beginning section of a bitstream 502 of RV2 respectively.

Method B: Bits to be included in a bitstream 521 of RV3-part2 are selected in equal numbers (50%:50%) from the beginning section of a bitstream 501 of RV1 and the beginning section of a bitstream 502 of RV2.

Method C: Bits to be included in a bitstream 531 of RV3-part2 are obtained by performing the most uniform possible puncturing for bitstreams of RV1 and RV2, [CB(0), CB(1), ..., CB(2Nc-1)]. According to this method, good performance can be expected in a decoding process when retransmission is performed without considering the priority of information bits and parity bits, as in the case of nonsystematic convolutional codes.

Method D: This method is the same as Method 2 for a code rate of r≦2/3, and a bitstream 541 of RV3-part2 is obtained by performing the most uniform possible puncturing for [CB(0), CB(1), ..., CB(N-1)] within a CB. Because the [CB(0), CB(1), ..., CB(N-1)] corresponds to information bits channel-coded by a turbo encoder, as many information bits as possible can be retransmitted, as compared to parity bits. Thus, good performance can be expected in a turbo decoding process.

The RV determination methods as described above are applied to each RLC block in the same manner even when n RLC data blocks are transmitted. For example, the overall RV includes data selected from $CB_i$ (i=1, 2, ..., n) for each encode RLC block. That is, the overall RV can be expressed by the following Equation (5):

$$RV = [CB_1, CB_2, \ldots, CB_n] \quad (5)$$

In Equation (5), $CB_i$ denotes a bitstream of RV selected from the ith RLC data block, which includes Nc/n bits.

Reference will now be made to a method of performing burst multiplexing according to an exemplary embodiment of the present invention.

A bitstream of RV selected by one of the above-mentioned methods is multiplexed into m bursts in a burst multiplexer. In a GERAN system, the bitstream of RV is multiplexed into four bursts. When using a CBRM technique, because a CBRM unit includes a sub-block interleaver, an external channel interleaver is not usually used so as to avoid complexity. Thus, in a multiplexing process, bit multiplexing is performed such that a bitstream of RV, forwarded from each RLC data block, can be distributed into respective bursts as uniform as possible, even without using an external channel interleaver. Hereinafter, a bit multiplexing method according to an embodiment of the present invention will be described separately for two cases.

First, a description will be given of how to perform bit multiplexing when intra-symbol bit priority is not considered.

When a transmission bitstream of RV is transmitted without considering the priority of each bit included in the bitstream, bit multiplexing is performed such that bits encoded into an RLC data block can be distributed well into m bursts. The output sequence of a CB generated from a jth encoded RLC data block, i.e., $CB_j$ in Equation (5), can be expressed by the following Equation (6):

$$CB_j = \{c_{j,0}, c_{j,1}, \ldots, c_{j,M-1}\} \quad (6)$$

In Equation (6), M denotes the number of bits, which corresponds to a multiple of m (in the case of the GERAN system, m=4). A bit $c_{j,i}$ denotes the ith bit of the jth $CB_j$, that is, $CB_j(i)$.

In the GERAN system, a bitstream $B_L$ allocated to the Lth burst (L=0, 1, 2, 3) can be expressed by the following Equation (7):

$$B_L = \{b_{L,0}, b_{L,1}, \ldots, b_{L,(M/m)n-1}\} \quad (7)$$

In Equation (7), n denoted the number of RLC data blocks. The rules for applying bit multiplexing into m bursts by using Equations (6) and (7) are given by the following Equation (8):

$$b_{L,i} = c_{(i \bmod n), L + \lfloor i/n \rfloor m} \text{ for } i=0, \ldots, (M/m)n-1 \quad (8)$$

In Equation (8), $b_{L,i}$ corresponds to the ith bit of the Lth burst.

After bit multiplexing is performed for four bursts (m=4, L=0, 1, 2, 3), data bits allocated to each burst can be expressed by the following Equation (9):

$$B_0 = \{c_{0,0} c_{1,0} \cdots c_{n-1,0} c_{0,m} c_{1,m} \cdots c_{n-1,m} c_{0,2m} c_{1,2m} \cdots$$
$$c_{n-1,2m} \cdots c_{0,(M/m-1)m} c_{1,(M/m-1)m} \cdots c_{n,(M/m-1)m}\}$$

$$B_1 = \{c_{0,1} c_{1,1} \cdots c_{n-1,1} c_{0,m+1} c_{1,m+1} \cdots c_{n-1,m+1}$$
$$c_{0,2m+1} c_{1,2m+1} \cdots c_{n-1,m+1} \cdots c_{0,(M/m-1)m+1}$$
$$c_{1,(M/m-1)m+1} \cdots c_{n,(M/m-1)m+1}\}$$

$$B_2 = \{c_{0,2} c_{1,2} \cdots c_{n-1,2} c_{0,m+2} c_{1,m+2} \cdots c_{n-1,m+2}$$
$$c_{0,2m+2} c_{1,2m+2} \cdots c_{n-1,2m+2} \cdots c_{0,(M/m-1)m+2}$$
$$c_{1,(M/m-1)m+2} \cdots c_{n,(M/m-1)m+2}\}$$

$$B_3 = \{c_{0,3} c_{1,3} \cdots c_{n-1,3} c_{0m,+3} c_{1,m+3} \cdots c_{n-1,m+3}$$
$$c_{0,2m+3} c_{1,2m+3} \cdots c_{n-1,2m+3} \cdots c_{0,(M/m-1)m+3}$$
$$c_{1,(M/m-1)m+3} \cdots c_{n,(M/m-1)m+3}\} \quad (9)$$

Although the above-described technique is illustrated for the case where several RLC data blocks are transmitted, it is obvious that the technique may be applied in the same manner even when one RLC data block is transmitted (i.e. n=1).

Figure 6:
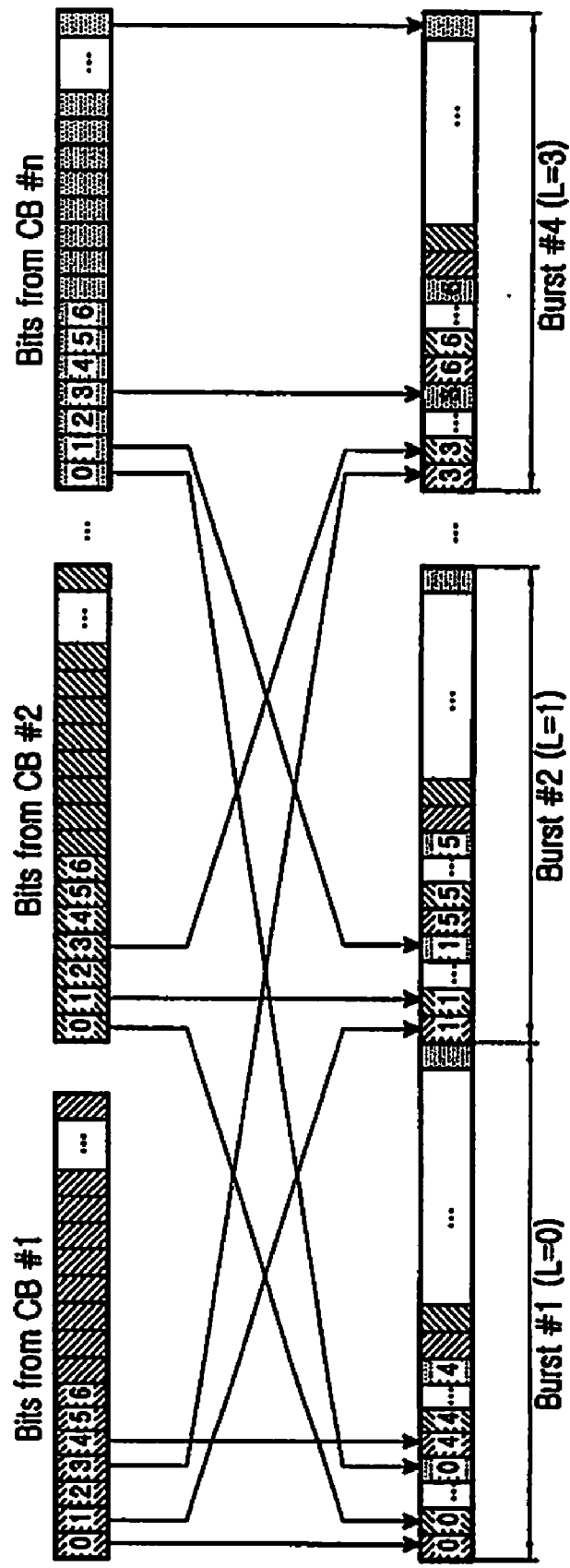
FIG. 6 is a view illustrating a method of multiplexing transmission data into four bursts in accordance with an embodiment of the present invention.

FIG. 6 illustrates bit multiplexing performed using Equation (8) according to an embodiment of the present invention.

Next, a description will be given of how to perform bit multiplexing when intra-symbol bit priority is considered.

When a transmission bitstream of RV is transmitted in consideration of the priority of each bit included in the bitstream, bit multiplexing is performed such that bits encoded into an RLC data block can be distributed well into m bursts. The output sequence of a CB generated from a jth encoded RLC data block, that is, $CB_j$ in Equation (5), can be expressed by the following Equation (10):

$$CB_j = \{\underbrace{c_{j,0}, c_{j,1}, \ldots, c_{j,M1-1}}_{\text{High priority bits}}, \underbrace{d_{j,0}, d_{j,1}, \ldots, d_{j,M2-1}}_{\text{Low priority bits}}\} \quad (10)$$

In Equation (10), a bit $c_{j,i}$ (i=0, 1, ..., M1−1) denotes a high priority bit, and a bit $d_{j,i}$ (i=0, 1, ..., M2−1) denotes a low priority bit. M1 and M2 denote the number of high priority bits and the number of low priority bits respectively, and each correspond to a multiple of m. A method of dividing data bits into $c_{j,i}$ and $d_{j,i}$ by considering bit priority may utilize a method disclosed in Korean Patent Application No. 10-2007-0059163, which was previously filed by Samsung Electronics Co., Ltd.

In the GERAN system, a bitstream $B_L$ allocated to the Lth burst (L=0, 1, 2, 3) can be expressed by the following Equation (11):

$$B_L = \{b_{L,0}, b_{L,1}, \ldots, b_{L,(M1/m)n-1}, b_{L,(M1/m)n}, \ldots,$$
$$b_{L,((M1+M2)/m)n+1}\} \quad (11)$$

In Equation (11), n denotes the number of RLC data blocks. The rules for applying bit multiplexing into i bursts by using Equations (10) and (11) can be expressed by the following Equation (12):

1) $b_{L,i} = c_{(i \bmod n), L + \lfloor i/n \rfloor m}$ for $i=0, \ldots, (M1/m)n-1$ 2) $b_{L,i} = d_{((i-(M1/m)n) \bmod n), L + \lfloor i-(M1/m)n \rfloor m}$ for $i = (M1/m)n, \ldots, ((M1+M2)/m)n-1$ $\quad (12)$ In Equation (12), $b_{L,i}$ corresponds to the ith bit of the Lth burst. After data bits are divided into high priority bits and low priority bits, and bit multiplexing of each of them is performed for four bursts (m=4, L=0, 1, 2, 3), data bits allocated to each can be expressed by the following Equation (13):

$$B_0 = \{c_{0,0} c_{1,0} \cdots c_{n-1,0} c_{0,m} c_{1,m} \cdots c_{n-1,m} c_{0,2m} c_{1,2m} \cdots$$
$$c_{n-1,2m} \cdots c_{0,(M1/m-1)m} c_{1,(M1/m-1)m} \cdots$$
$$c_{n,(M1/m-1)m} d_{0,0} d_{1,0} \cdots d_{n-1,0} d_{0,m} d_{1,m} \cdots$$
$$d_{n-1,m} d_{0,2m} d_{1,2m} \cdots d_{n-1,2m} \cdots d_{0,(M1/m-1)m}$$
$$d_{1,(M1/m-1)m} \cdots d_{n,(M1/m-1)m}\}$$

$$B_1 = \{c_{0,1} c_{1,1} \cdots c_{n-1,1} c_{0,m+1} c_{1,m+1} \cdots c_{n-1,m+1}$$
$$c_{0,2m+1} c_{1,2m+1} \cdots c_{n-1,2m+1} \cdots c_{0,(M1/m-1)m+1}$$
$$c_{1,(M1/m-1)m+1} \cdots c_{n,(M1/m-1)m+1} d_{0,1} d_{1,1} \cdots$$
$$d_{n-1,1} d_{0,m+1} d_{1,m+1} \cdots d_{n-1,m+1} d_{0,2m+1} d_{1,2m+1} \cdots$$
$$d_{n-1,2m+1} \cdots d_{0,(M2/m-1)m+1} d_{1,(M2/m-1)m+1} \cdots$$
$$d_{n,(M2/m-1)m+1}\}$$

$$B_2 = \{c_{0,2} c_{1,2} \cdots c_{n-1,2} c_{0,m+2} c_{1,m+2} \cdots c_{n-1,m+2}$$
$$c_{0,2m+2} c_{1,2m+2} \cdots c_{n-1,2m+2} \cdots c_{0,(M1/m-1)m+2}$$
$$c_{1,(M1/m-1)m+2} \cdots c_{n,(M1/m-1)m+2} d_{0,2} d_{1,2} \cdots$$
$$d_{n-1,2} d_{0,m+2} d_{1,m+2} \cdots d_{n-1,m+2} d_{0,2m+2} d_{1,2m+2} \cdots$$
$$d_{n-1,2m+2} \cdots d_{0,(M2/m-1)m+2} d_{1,(M2/m-1)m+2} \cdots$$
$$d_{n,(M2/m-1)m+2}\}$$

$$B_3 = \{c_{0,3} c_{1,3} \cdots c_{n-1,3} c_{0,m+3} c_{1,m+3} \cdots c_{n-1,m+3}$$
$$c_{0,2m+3} c_{1,2+3} \cdots c_{n-1,2m+3} \cdots c_{0,(M1/m-1)m+3}$$
$$c_{1,(M1/m-1)m+3} \cdots c_{n,(M1/m-1)m+3} d_{0,3} d_{1,3} \cdots$$
$$d_{n-1,3} d_{0,m+3} d_{1,m+3} \cdots d_{n-1,m+3} d_{0,2m+3} d_{1,2m+3} \cdots$$
$$d_{n-1,2m+3} \cdots d_{0,(M2/m-1)m+3} d_{1,(M2/m-1)m+3} \cdots$$
$$d_{n,(M2/m-1)m+3}\} \quad (13)$$

Although the above-described technique is illustrated for the case where several RLC data blocks are transmitted, it is obvious that the technique may be applied in the same manner even when one RLC data block is transmitted (i.e., n=1).

Figure 7:
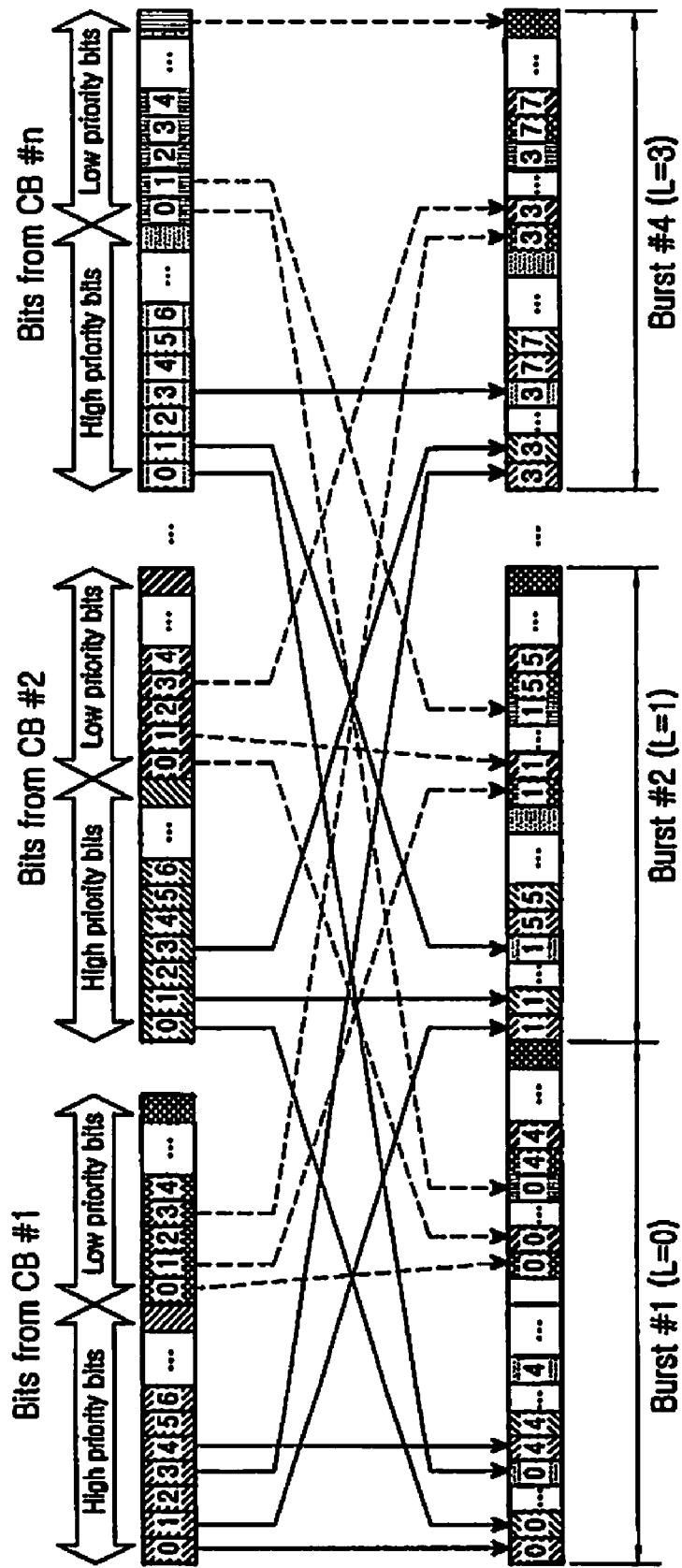
FIG. 7 is a view illustrating a method of multiplexing transmission data into four bursts in consideration of bit priority in accordance with an embodiment of the present invention.

FIG. 7 illustrates bit multiplexing separately performed for high priority bits and low priority bits by using Equation (12).

Data bits subjected to burst multiplexing, in particular, data bits for which bit multiplexing is performed in consideration of bit priority, may utilize symbol mapping applicable to higher order modulation, such as 8 PSK and 16/32/64-QAM. For example, such symbol mapping technology may utilize a method disclosed in Korean Patent Application No. 10-20070059165, which was previously filed by Samsung Electronics Co., Ltd.

Reference will now be made to a structure of a receiver according to an embodiment of the present invention.

Figure 8:
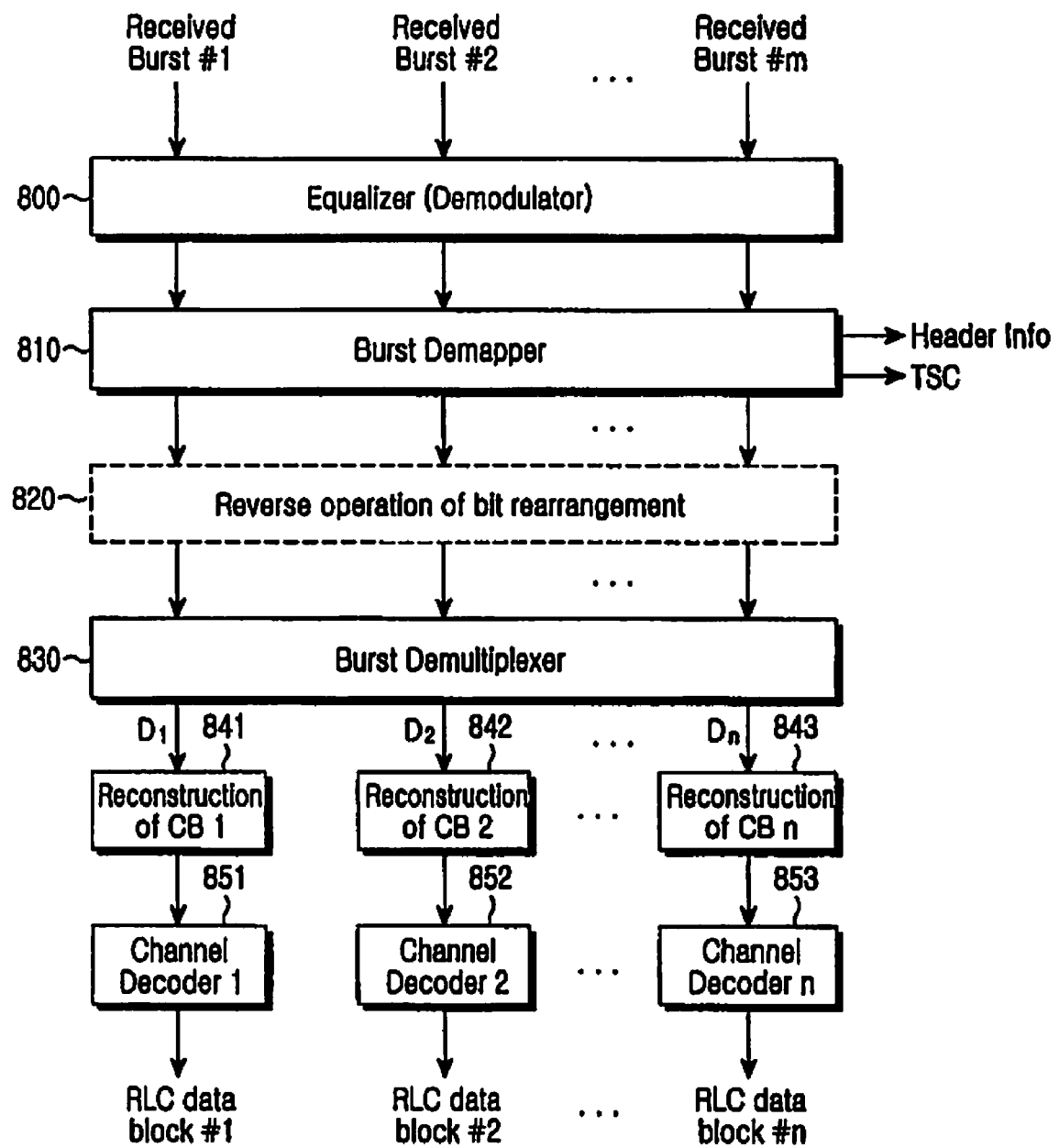
FIG. 8 is a block diagram illustrating a structure of a receiver for decoding RLC data blocks in accordance with an embodiment of the present invention.

FIG. 8 illustrates a structure of a receiver for decoding RLC data blocks according to an embodiment of the present invention. Referring to FIG. 8, the receiver receives m burst data (received burst #1 to #m), and then estimates a channel state from a TSC known to the receiver. The estimated channel state is used for data equalization in an equalizer or demodulator 800. A burst demapper 810 separates header information and a TSC from each burst data that has passed through the equalizer 800, and then extracts data from each burst. When bit rearrangement 820 has been applied in a transmitter, the reverse operation to the bit rearrangement is performed for the received data of each burst, and then a burst demultiplexer 830 demultiplexes m burst data. The demultiplexed data $D_1$ to $D_n$ are reconstructed into $CB_1$ to $CB_n$ 841 to 843 respectively, and then are restored to RLC data blocks #1 to #n by respective channel decoders 851 to 853.

Figure 9:
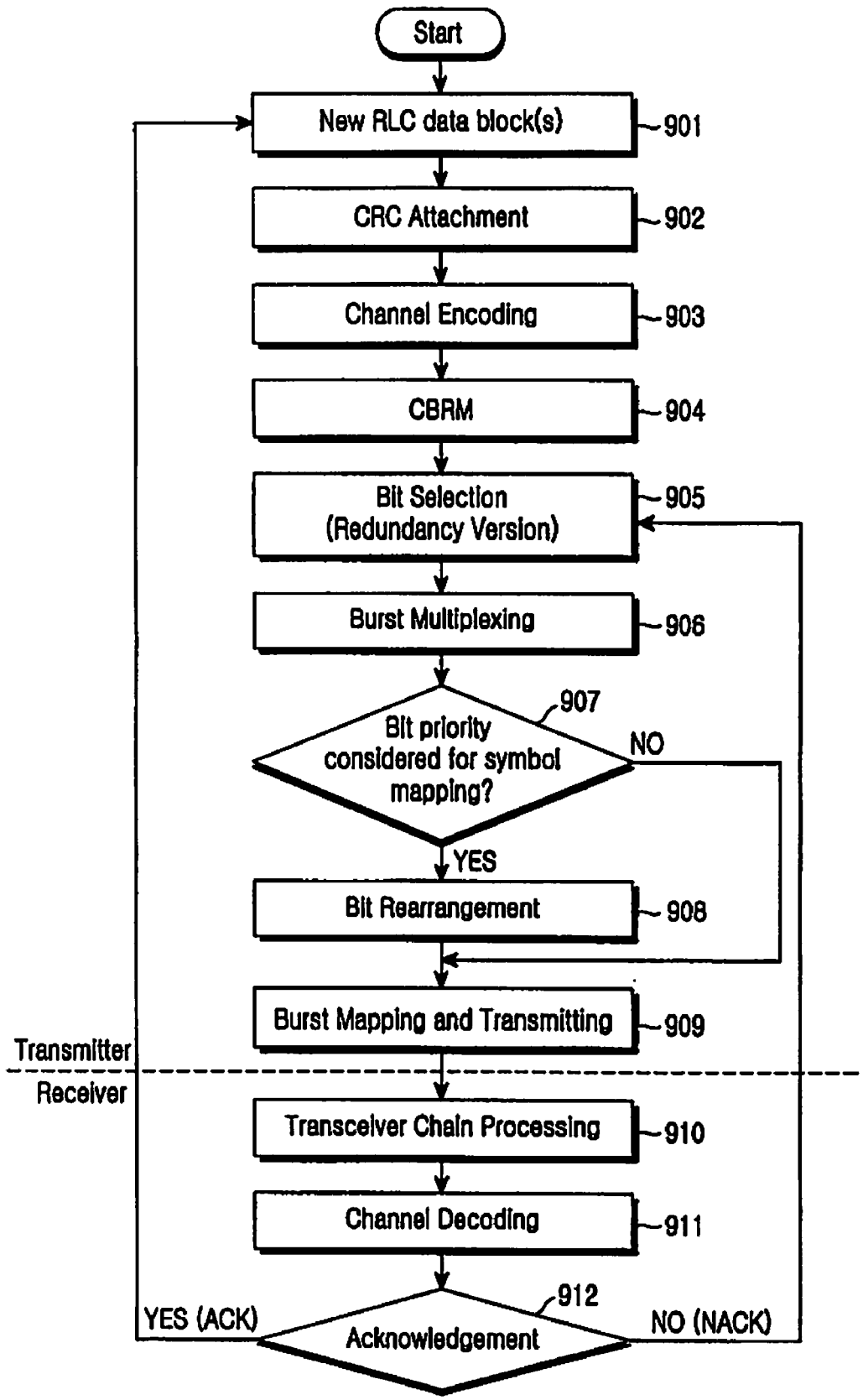
FIG. 9 is a signal flowchart in a transceiver in accordance with an embodiment of the present invention.
Figure 10:
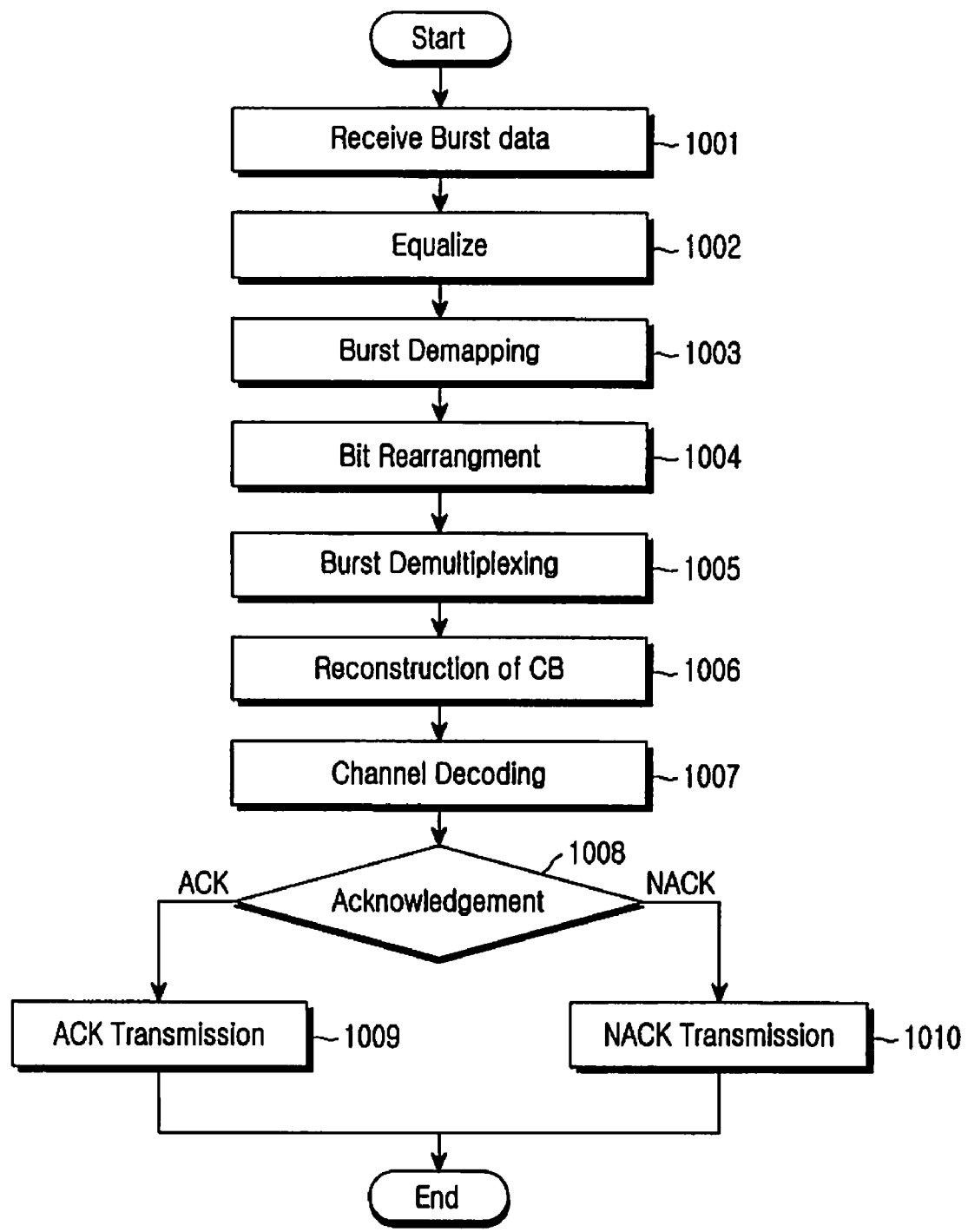
FIG. 10 is a signal flowchart in a receiver in accordance with an embodiment of the present invention.

FIGS. 9 and FIG. 10 illustrate signal flow charts in the aforementioned transmitter and receiver, respectively. In FIGS. 9 and 10, a retransmission technique based on Acknowledgement/negative Acknowledgement (ACK/NACK) signals is applied to the transmitter and the receiver. That is, when the receiver fail to decode an RLC data block, it requests retransmission by transmitting an NACK signal, and the transmitter transmits a new bitstream of RV, stored in a CB, at the request of the receiver. Because the receiver stores soft information on previous received data, and uses soft information on both the newly transmitted bitstream of RV and the previously transmitted bitstream of RV for decoding, decoding performance can be improved. When the receiver successfully decodes an RLC data block, it transmits an ACK signal to the transmitter so that the transmitter can transmit new RLC data block(s).

Referring to FIG. 9, if new RLC data block(s) occur in step 901, the transmitter adds a CRC bit to the RLC data blocks in step 902, performs channel encoding in step 903, and then performs a CBRM process in step 904. The transmitter selects a bitstream of RV according to the aforementioned embodiment of the present invention in step 905, and performs burst multiplexing in step 906. In step 907, the transmitter determines whether or not to consider intra-symbol bit priority in symbol mapping, and performs bit rearrangement in step 908, when bit priority is considered. In step 909, the transmitter maps the respective bits to multiplexed bursts, and transmits them.

The receiver performs every procedure for processing data transmitted from the transmitter in step 910, and then performs channel decoding in step 911. According to whether or not the channel decoding is successful, in step 912, the receiver determines which of ACK/NACK signals is transmitted, and transmits a corresponding signal, based on a result of the determination.

Upon receiving an ACK signal from the receiver, the transmitter returns to step 901, and performs an operation transmitting new data. However, upon receiving an NACK signal, the transmitter returns to step 905, and performs an operation for retransmitting data.

Referring to FIG. 10, the receiver receives burst data in step 1001, and then performs data equalization in step 1002. In step 1003, the receiver separates header information and a TSC from each burst data through burst demapping, thereby extracting data from each burst. When bit rearrangement has been applied in the transmitter, the receiver performs the reverse operation to the bit rearrangement for the received data of each burst in step 1004, and then demultiplexes the burst data in step 1005. The receiver reconstructs the demultiplexed data into Circular Buffers (CBs) in step 1006, and then performs channel decoding in step 1007, thereby restoring the data to RLC data blocks.

According to whether or not the channel decoding is successful, in step 1008, the receiver determines which of ACK/NACK signals is transmitted, and transmits a corresponding signal to the transmitter in steps 1009 and 1010, on a result of the determination. After the receiver transmits the ACK/NACK signal, it receives new data or retransmitted data.

As described above, the various embodiments of the present invention can reduce the performance degradation of turbo codes at IR retransmission by efficiently determining two or three RVs according to data code rates in a wireless communication system employing CBRM.

Further, the present invention can prevent a possible burst error at existing sequential mapping by burst-multiplexing encoded data of RLC data blocks into m bursts bit-by-bit without using an external channel interleaver, particularly when several RLC data blocks are transmitted via radio blocks in a wireless communication system employing CBRM.

When symbol matching is performed in consideration of bit priority, the present invention can improve channel coding gain through symbol mapping after passing through independent burst multiplexing.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of performing circular buffer rate matching in a communication system, the method comprising:
    selecting a first bitstream for a first transmission of an information bitstream from a bitstream, the bitstream being channel-coded, interleaved in units of sub-blocks, and stored in a circular buffer, the first bitstream including Nc sequential bits starting from a bit of the bitstream stored in the circular buffer; and
    selecting a second bitstream for retransmission of the information bitstream, the second bitstream including Nc bits,
    wherein a first part of the second bitstream includes bits from a last bit of bitstreams selected at previous transmission including the first transmission to a last bit of the bitstream stored in the circular buffer, and a second part of the second bitstream includes bits punctured from the bitstreams selected at the previous transmission,
    wherein the second part of the second bitstream includes bits uniformly punctured from a bitstream including bits that start from the first bit stored in the circular buffer and have equal size to that of the sub-block, among bits included in the bitstreams selected at the previous transmission.

2. The method of claim 1, wherein the second part of the second bitstream includes bits uniformly punctured from all the bitstreams selected at the previous transmission.

3. A method of performing circular buffer rate matching in a communication, the method comprising:
    selecting a first bitstream for a first transmission of an information bitstream from a bitstream, the bitstream being channel-coded, interleaved in units of sub-blocks, and stored in a circular buffer, the first bitstream including Nc sequential bits starting from a bit of the bitstream stored in the circular buffer; and
    selecting a second bitstream for retransmission of the information bitstream, the second bitstream including Nc bits,
    wherein a first part of the second bitstream includes bits from a last bit of bitstreams selected at previous transmission including the first transmission to a last bit of the bitstream stored in the circular buffer, and second and third parts of the second bitstream includes bits selected in equal numbers from the respective bitstreams selected at the previous transmission,
    wherein the second and third parts of the second bitstream include consecutive bits selected in equal numbers from the respective bitstreams selected at the previous transmission.

4. The method of claim 3, wherein the second and third parts of the second bitstream include bits selected in equal numbers from the respective bitstreams selected at the previous transmission, starting from first bits thereof.

5. A transmission apparatus using a circular buffer rate matching technique in a communication system, the transmission apparatus comprising:
a channel encoder for channel encoding radio link data;
a rate matching unit for rate matching the encoded data according to prescribed rules;
a multiplexer for uniformly arranging the rate matched data in a plurality of bursts; and
a transmitter for mapping the multiplexed data to a transmission resource, and transmitting the mapped data,
wherein the prescribed rules include selecting a first bitstream for a first transmission of an information bitstream from a bitstream, the bitstream being channel-coded, interleaved in units of sub-blocks, and stored in a circular buffer, the first bitstream including Nc sequential bits starting from a bit of the bitstream stored in the circular buffer, and selecting a second bitstream for retransmission of the information bitstream, the second bitstream including Nc bits,
wherein a first part of the second bitstream comprises bits from a last bit of bitstreams selected at previous transmission including the first transmission to a last bit of the bitstream stored in the circular buffer, and a second part of the second bitstream comprises bits punctured from the bitstreams selected at the previous transmissions,
wherein the second part of the second bitstream comprises bits uniformly punctured from a bitstream including bits that start from the first bit in the circular buffer and have equal size to that of the sub-block, among bits included in the bitstreams selected at the previous transmission.

6. The transmission apparatus of claim 5, wherein the second part of the second bitstream comprises bits uniformly punctured from all the bitstreams selected at the previous transmission.

7. A transmission apparatus using circular buffer rate matching in a communication system, the transmission apparatus comprising:
a channel encoder for channel encoding radio link data;
a rate matching unit for rate matching the encoded data according to prescribed rules;
a multiplexer for uniformly arranging the rate matched data in a plurality of bursts; and
a transmitter for mapping the multiplexed data to a transmission resource, and transmitting the mapped data,
wherein the prescribed rules include selecting a first bitstream for a first transmission of an information bitstream from a bitstream, the bitstream being channel-coded, interleaved in units of sub-blocks, and stored in a circular buffer, the first bitstream including Nc sequential bits starting from a bit of the bitstream stored in the circular buffer, and selecting a second bitstream for retransmission of the information bitstream, the second bitstream including Nc bits,
wherein a first part of the second bitstream includes bits from a last bit of bitstreams selected at previous transmission including the first transmission to a last bit of the bitstream stored in the circular buffer, and second and third parts of the second bitstream include bits selected in numbers from the respective bitstreams selected at the previous transmission,
wherein the second and third parts of the second bitstream comprise consecutive bits selected in equal numbers from the respective bitstreams selected at the previous transmission.

8. The transmission apparatus of claim 7, wherein the second and third parts of the second bitstream comprise bits selected in equal numbers from the respective bitstreams selected at the previous transmission, starting from first bits thereof.

9. A reception apparatus for receiving data, to which a circular buffer rate matching technique is applied, in a communication system, the reception apparatus comprising:
a demultiplexer for demultiplexing received data bursts into a plurality of data blocks;
a reconstruction unit for reconstructing the plurality of data blocks into a bitstream to be stored in each of at least one circular buffer; and
at least one channel decoder for restoring an information bitstream by decoding the bitstream from each circular buffer,
wherein, at a first transmission, the bitstream to be stored in the circular buffer includes a first bitstream selected from a bitstream that is channel-coded, interleaved in units of sub-blocks, and stored in a circular buffer, the first bitstream including Nc sequential bits starting from a bit of the bitstream stored in the circular buffer, and
wherein, at a retransmission, the bitstream to be stored in the circular buffer includes a second bitstream, the second bitstream including Nc bits, a first part of the second bitstream including bits from a last bit of bitstreams selected at previous transmission including the first transmission to a last bit of the bitstream stored in the circular buffer, and a second part of the second bitstream including bits punctured from the bitstreams selected at the previous transmission,
wherein the second part of the second bitstream comprises bits uniformly punctured from a bitstream comprising bits that starts from the first bit in the circular buffer and have equal size to that of the sub-block, among bits included in the bitstreams selected at the previous transmission.

10. The reception apparatus of claim 9, wherein the second part of the second bitstream comprises bits uniformly punctured from all the bitstreams selected at the previous transmission.

11. A reception apparatus for receiving data, to which a circular buffer rate matching technique is applied, in a communication system, the reception apparatus comprising:
a demultiplexer for demultiplexing received data bursts into a plurality of data blocks;
a reconstruction unit for reconstructing the plurality of data blocks into a bitstream to be stored in each of at least one circular buffer; and
at least one channel decoder for restoring an information bitstream by decoding the bitstream from each circular buffer,
wherein, at a first transmission, the bitstream to be stored in the circular buffer includes a first bitstream selected from a bitstream that is channel-coded, interleaved in units of sub-blocks, and stored in a circular buffer, the first bitstream including Nc sequential bits starting from a bit of the bitstream stored in the circular buffer, and
wherein, at a retransmission, the bitstream to be stored in the circular buffer includes a second bitstream, the second bitstream including Nc bits, a first part of the second bitstream including bits from a last bit of bitstreams selected at previous transmission including the first transmission to a last bit of the bitstream stored in the circular buffer, and second and third parts of the second bitstream including bits selected in equal numbers from the respective bitstreams selected at the previous transmission, wherein the second and third parts of the second bitstream comprise consecutive bits selected in equal numbers from the respective bitstreams selected at the previous transmission.

12. The reception apparatus of claim 11, wherein the second and third parts of the second bitstream comprise bits selected in equal numbers from the respective bitstreams selected at the previous transmission, starting from first bits thereof.

* * * * *